United States Patent [19]

Hubert et al.

[11] Patent Number: 4,572,802

[45] Date of Patent: Feb. 25, 1986

[54] PROCESS FOR RECOVERING ACTINIDES AND/OR LANTHANIDES

[75] Inventors: Hervé Hubert, Rennes; Claude Musikas, Bures-Yvette, both of France

[73] Assignee: Commissariat a l'Energie Atomique, Paris, France

[21] Appl. No.: 556,296

[22] Filed: Nov. 30, 1983

[30] Foreign Application Priority Data

Dec. 1, 1982 [FR] France .................. 82 20129

[51] Int. Cl.$^4$ .................................. C07F 3/06
[52] U.S. Cl. .................................. 534/12; 423/9; 534/15
[58] Field of Search .......... 260/429.1, 429.2; 252/631, 637, 638, 641, 642, 643; 423/9

[56] References Cited

U.S. PATENT DOCUMENTS

| Re. 28,465 | 7/1975 | Langer, Jr. et al. | 260/429.1 |
| 3,373,177 | 3/1968 | Young | 260/429.1 |
| 3,463,619 | 8/1969 | Ritter et al. | 260/429.1 |
| 3,692,500 | 9/1972 | Coupat et al. | 260/429.1 |
| 3,775,533 | 11/1973 | Bakker | 260/429.1 |
| 3,836,625 | 9/1974 | Schäfer et al. | 260/429.1 |
| 3,839,405 | 10/1974 | Dannals | 260/429.1 |
| 4,352,751 | 10/1982 | Wieder et al. | 260/429.1 |

OTHER PUBLICATIONS

Chemical Abstracts, vol. 91, No. 20, 11/12/79, p. 398.
Chemical Abstracts, vol. 94, 1981, p. 419.
Chemical Abstracts, vol. 72, 1970, p. 385.
Hydrometallurgy, vol. 8, No. 4, Jul.-1982, pp. 379-388.

Primary Examiner—Ben R. Padgett
Assistant Examiner—T. J. Wallen
Attorney, Agent, or Firm—Oblon, Fisher, Spivak, McClelland & Maier

[57] ABSTRACT

This invention relates to a process of recovering trivalent actinides, trivalent lanthanides or mixtures thereof from an aqueous acid solution by contacting the aqueous solution with an organic solution containing the diamides of the formula:

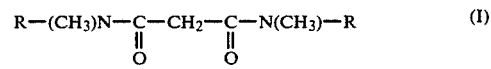

where R is $C_2$-$C_{10}$ alkyl. This process affords a good extraction efficiency level for the recovery of lanthanides and actinides, both of which are present in the trivalent state, or mixtures thereof, from installations for the reprocessing of irradiated nuclear fuels.

11 Claims, 3 Drawing Figures

PROCESS FOR RECOVERING ACTINIDES AND/OR LANTHANIDES

BACKGROUND OF THE INVENTION

1. Field of the Invention

The present invention relates to a process for recovering actinides and/or lanthanides present in the trivalent state in an acid aqueous solution, particularly in a nitric solution.

2. District of the Prior Art

In installations for the reprocessing of irradiated nuclear fuels, it is standard practice to obtain in the first phase of the extraction of uranium and plutonium, aqueous solutions of fission products containing relatively large quantities of trivalent ions of lanthanides and actinides. The effluents from these installations also contain the same ions.

In view of the relatively long period of trivalent actinide elements, it is of considerable interest to separate these from nitric aqueous solutions, in order to obviate the handling of waste and effluents having a high α activity. Hitherto, this separation has been carried out by solvent extraction, using as extractants neutral or acid organophosphorus compounds. However, the use of such extractants has proved relatively unsatisfactory, because their extraction efficiency with respect to trivalent ions is low and their industrial use causes numerous problems, as a result of the need to work at a pH-value higher than 2 and the necessity of using large quantities of salifying agents, which increases the volume of the waste and the processing costs.

Consideration has also been given to the carrying out of said separation with other bidentate or neutral organophosphorus compounds, such as diphosphonates and carbamylphosphonates, together with amides, as described in J. Inorg. Nucl. Chem. 25, 1963, pp. 883–882, J. Inorg. Nucl. Chem. 26, 1964, pp. 1991–2003, and Separation Science and Technology, 15, (4), pp. 825–844, 1980.

However, the results obtained are not satisfactory, particularly with diamides such as tetrabutyl malonamide, because the extraction efficiency levels are low.

However, research has been carried out on other diamides, because there are certain advantages in using amides for the extraction. Thus, the processes used in the preparation of amides are generally simple and inexpensive, whilst their radiolytic and chemical stability is generally good. Moreover, amide degradation products (carboxylic acids and amines) do not disturb the extraction cycle and are easy to eliminate. Finally, the thermal decomposition of diamides causes no serious problems, unlike in the case of organophosphorus extractants.

SUMMARY OF THE INVENTION

The present invention specifically relates to a process for the recovery of lanthanides and/or actinides present in the trivalent state in an aqueous solution, by extraction using novel diamides and making it possible to obtain good extraction efficiency levels.

DESCRIPTION OF THE PREFERRED EMBODIMENTS

Thus, the invention relates to a process for recovering the actinides and/or lanthanides present in the trivalent state in an acid aqueous solution, wherein it consists of contacting said aqueous solution with an organic phase containing an extraction agent, constituted by a diamide formula:

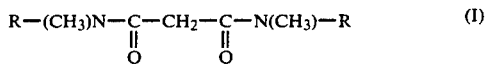

in which R is an alkyl radical with between 2 and 10 carbon atoms.

Such diamides can be obtained by reacting the chloride of malonic acid on the corresponding secondary amine, in the presence of triethylamine, in accordance with the following reaction diagram:

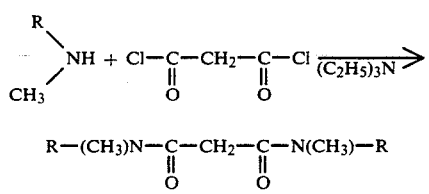

Under these conditions, the product obtained is constituted by a mixture of the three isomers respectively having the following formulas:

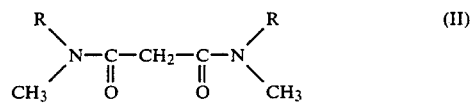

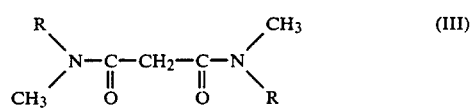

According to the invention, it is possible to use as the extraction agent, one of the said isomers or a mixture thereof, and formula (I) given hereinbefore represents one of the isomers or a mixture of two or three thereof.

The secondary amines used as the starting product for the synthesis of the diamides according to the invention can be prepared by reacting the appropriate bromide on methyl amine in accordance with the following reaction diagram:

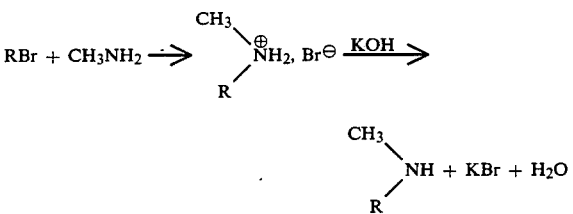

For performing the process according to the invention, preference is given to the use of diamides in which R represents an alkyl radical having more than 4 carbon atoms and preferably an alkyl radical having 4 to 8 carbon atoms, e.g. the butyl radical or the octyl radical.

The best results are obtained when the number of carbon atoms of the alkyl radical is higher, because the solubility of the extractant is then greater in the organic phase.

According to the invention, the organic phase generally consists of a diluent and the diamide concentration of the organic phase is preferably 0.1 to 1.5 mol.l$^{-1}$.

Thus, the extraction level generally increases with the diamide concentration of the organic phase. However, to maintain the viscosity and density of the organic phase, within an appropriate range, the diamide content of such phase is generally limited to the range 0.5 to 1.5 mol.l$^{-1}$.

The diluents which can be used are inert organic diluents, preferably having a higher dielectric constant. Examples of such diluents are benzene, xylene, mesitylene, tert. butyl benzene, decanol, dodecane and mixtures thereof.

Generally ter-butyl benzene is used as the diluent, optionally mixed with dodecane, the dodecane concentration varying from 0 to 60% by volume. Thus, although dodecane has the lowest dielectric constant, it is generally necessary to use it in mixture with other diluents, because the solubility of the diamides according to the invention is limited in dodecane.

For performing the process according to the invention, it is preferable to pretreat the organic phase by contacting it with an acid aqueous solution containing the same acid in the same concentration as the aqueous solution to be treated, containing actinides and/or lanthanides.

Generally, the acid aqueous solution to be treated is a nitric solution and in this case the organic phase is contacted with an aqueous solution having the same nitric acid concentration. When the acid aqueous solution to be treated is a perchloric solution, this pretreatment of the organic phase takes place by contacting with a perchloric solution having the same perchloric acid concentration. This pretreatment makes it possible to neutralize or saturate the organic phase, so as not to change the concentrations of the solution to be treated.

When the process according to the invention is used in the treatment or processing of nitric solutions, it is preferable for the nitric acid concentration of the solution to be $10^{-1}$ to 5 mol.l$^{-1}$.

According to the invention, it is also possible to improve the lanthanide and actinide extraction levels by adding to the acid aqueous solution and before contacting it with the organic phase, an excess of anions corresponding to the acid contained therein, e.g. nitrate ions when the solution is a nitric solution or perchlorate ions when the solution is a perchloric acid solution.

It is pointed out that the process according to the invention can be carried out in any conventional extractional apparatus, such as banks of mixer-settlers, pulsed columns, centrifugal extractors, etc. Generally, working takes place at ambient temperature and pressure, with aqueous phase/organic phase ratios varying between 0.2 and 5.

The actinides (II) and lanthanides (III) extracted in the organic phase can then be recovered with very good efficiency levels by reextraction in water.

BRIEF DESCRIPTION OF THE DRAWINGS

Other characteristics and advantages of the invention can be gathered from the following examples, given in an illustrative and non-limitative manner and with reference to the drawings, wherein show.

EXAMPLES

Example 1

Figure 1:
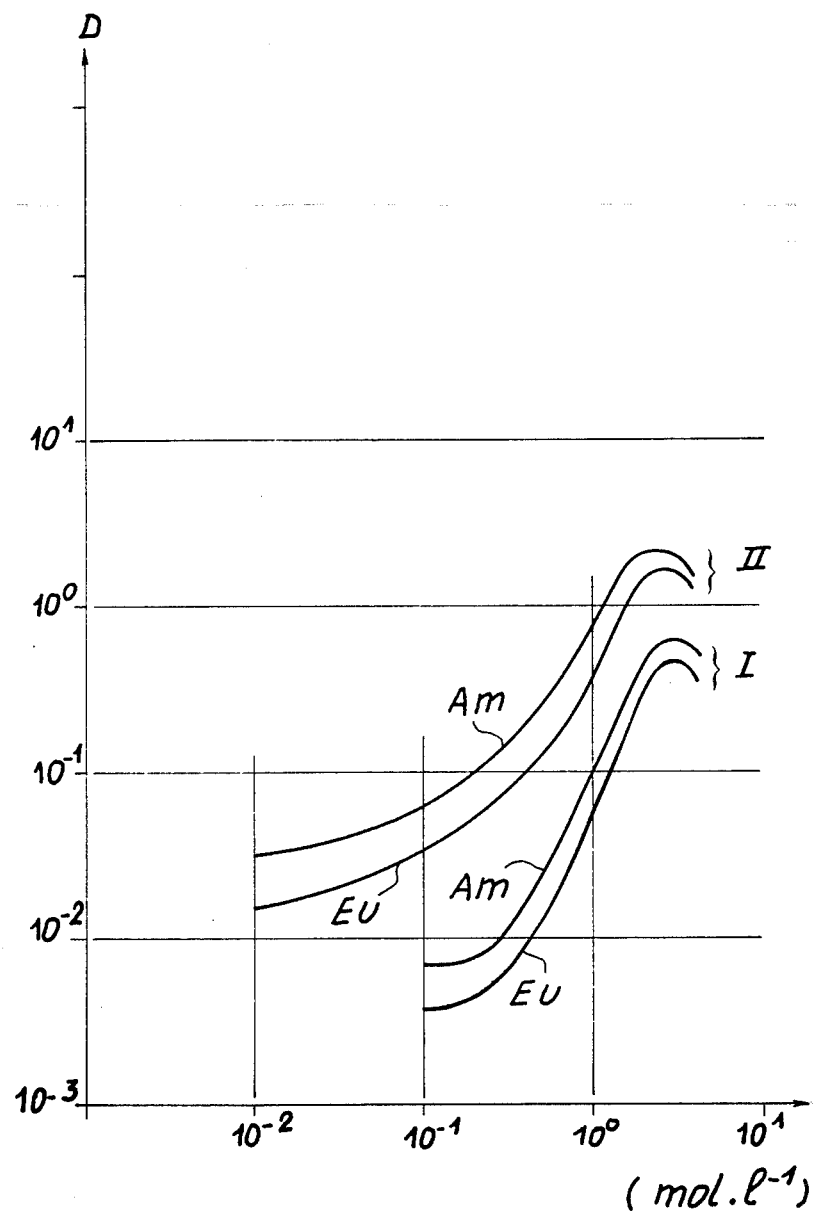
FIG. 1 a graph showing the variations of the distribution coefficients $D_{Am}$ of americium and $D_{Eu}$ of europium, as a function of the nitric acid concentration of the aqueous solution to be treated.

Preparation of N,N'-dimethyl-N,N'-dioctyl malonamide (a) Preparation of N-methyl-N-octyl amine N-methyl-N-octyl amine is prepared in the following way:

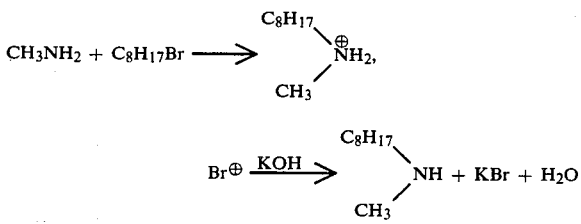

405 g of a 37% methyl amine solution in ethanol and 150 g of n-octyl bromide were introduced into a 1 liter autoclave. The autoclave is heated to 180° C. for 20 hours and then to 200° C. for 8 hours. The crude residue is evaporated to dryness after cooling. Thus, a grey crystalline residue is obtained, which is treated with 300 ml of a 20% potassium solution. The aqueous phase is extracted with ether, the ethereal phase is dried on magnesium sulphate, followed by filtration and expulsion of the ether. The sought product is then recoered with a good yield by distillation (approximately 70%). The boiling point is 75° to 78° C., under 13 mmHg.

(b) Preparation of the diamide

The product obtained, i.e. N-methyl-N-octyl amine is then reacted with malonyl chloride in order to obtain the corresponding diamide in accordance with the following reaction diagram:

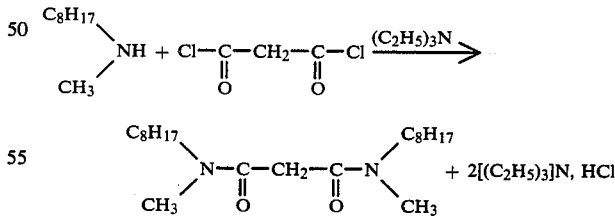

1 mole of N-methyl-N-octylamine and 1 mole of triethyl amine are introduced into a reactor containing 300 ml of methylene chloride. The reactor is cooled to a temperature of 10° C. by means of an ice bath. This is followed by the dropwise addition of a solution of 0.5 mole of malonyl chloride in 150 ml of methylene chloride. Following the addition, the reaction medium is allowed to return to ambient temperature, whilst maintaining stirring for 2 hours. The product obtained is then washed several times with water, then with a 10% sodium carbonate solution and finally with water. This is followed by drying, expulsion of the solvent and recovery of the product by successive recrystallizations in hexane. In this way diamide with a melting point of 41° C. is obtained. This product was identified by nuclear magnetic resonance of the proton in CDCl$_3$+TMS, the results being given in the attached Table 1. The purity was determined at 99.5% by potentiometric determination.

Example 2

Preparation of N,N-dimethyl-N,N'-dibutyl-malonamide

This amide is prepared by reacting commercial N-methyl-N-butyl amine with malonyl chloride in accordance with the following reaction diagram:

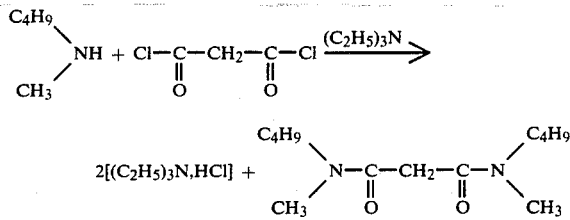

To this end, one mole of N-methyl-N-butyl-amine and 1 mole of triethylamine are dissolved in 300 ml of methylene chloride. This is followed by cooling to 10° C. and progressively adding to the reaction medium 0.5 mole of malonyl chloride in 150 ml of methylene chloride. Addition takes place slowly because the reaction is highly exothermic. Following this addition, the reaction medium is allowed to return to ambient temperature, followed by stirring for two hours. Washing then takes place on a number of occasions with water in order to eliminate the hydrochloride, then once with 10% sodium carbonate solution in order to eliminate the residual acid and then on a further occasion with water. This is followed by drying and expulsion of the solvent, the sought product distilling at 140° to 144° C. under 0.3 mmHg, with a yield of 45%.

The product is then recrystallized in hexane and in this way white crystals with a melting point of 52° C. are obtained. The product is characterized by potentiometric determination and by nuclear magnetic resonance of the proton in CDCl$_3$, whilst using TMS as the reference. The NMR results obtained are given in the attached Table 2, and the potentiometric determination gives a purity of 99%.

Example 3

This example relates to the recovery of the americium and europium respectively present at concentrations of $10^{-6}$ mol.l$^{-1}$ for Am (III) and $2.5.10^{-2}$ mol.l$^{-1}$ for Eu (III) in nitric aqueous solutions of different acidity.

In all these cases, use is made of an organic phase constituted by Diam-8 (i.e. the diamide of formula (I) in which R represents the octyl radical) dissolved in tert. butyl benzene (Solgyl), the Diam-8 concentration of the organic phase being 0.5 mol.l$^{-1}$ for 1 mol.l$^{-1}$. In this example, the organic phase undergoes a pretreatment, which consists of contacting it with the nitric aqueous solution with a HNO$_3$ concentration identical to that of the solution containing americium and europium, by using for said contacting an aqueous phase/organic phase volume ratio equal to 5. After stirring for two minutes, then after separating the phases, extraction is carried out by contacting the prebalanced organic phase and the aqueous phase containing americium and europium (organic phase/aqueous phase ratio=1). The americium or europium concentrations of the aqueous phase and the organic phase are measured and the distribution coefficients of the americium and europium corresponding to the ratio of the concentration of the element (Am or Eu) in the organic phase to the concentration of the same element in the aqueous phase are determined.

The results obtained are given in FIG. 1, where curves I for Am and Eu relate to the operations performed with a Diam-8 concentration of 0.5 mol.l$^{-1}$ in the organic phase and a europium nitrate concentration of $1.10^{-2}$ mol.l$^{-1}$ in the aqueous phase, whilst curve II for Am and Eu relate to the operation performed with an organic phase containing 1 mol.l$^{-1}$ of Diam-8 and an aqueous phase containing $2.10^{-2}$ mol.l$^{-1}$ of europium nitrate. The curves show that in all cases, the americium and europium distribution coefficients increase with the nitric acid concentration of the aqueous phase and have a maximum for a nitric acid concentration of 3 mol.l$^{-1}$.

Moreover, according to the invention, to obtain a good extraction of actinides and lanthanides in the trivalent state, it is preferable for the aqueous phase containing them to have a nitric acid concentration of 1 to 5 mol.l$^{-1}$.

Example 4

This example also relates to the recovery of the americium and europium present in the trivalent state in a nitric aqueous phase having a HNO$_3$ concentration of 1 mol.l$^{-1}$, an Am (III) concentration of $10^{-6}$ mol.l$^{-1}$ and an Eu (III) concentration of $2.5.10^{-2}$ mol.l$^{-1}$.

Figure 2:
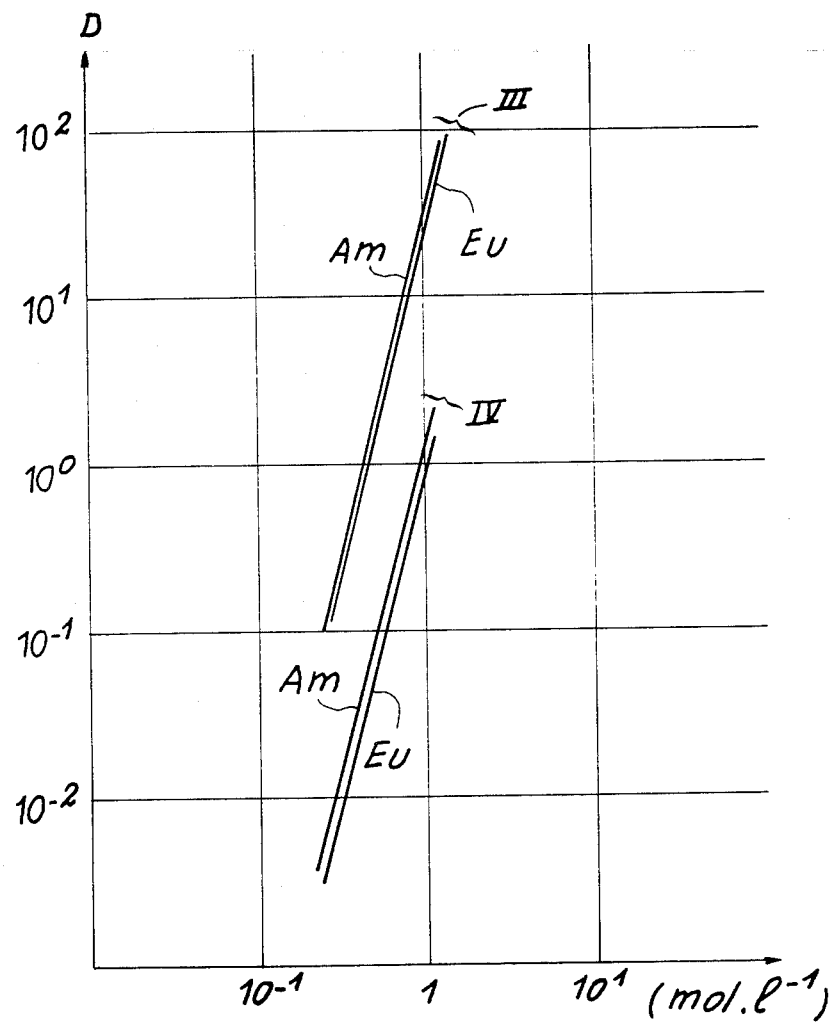
FIG. 2 a graph showing the variations of the distribution coefficients $D_{Am}$ of americium and $D_{Eu}$ of europium, as a function of the diamide concentration of the organic phase.

For the extraction, use is made of an organic phase constituted by Diam-8 diluted in tert. butyl benzene. In this example, the influence of the Diam-8 concentration of the organic phase is studied and the extraction is carried out under the same conditions as in Example 3, after prebalancing the organic phase with a nitric solution. The results obtained are given in FIG. 2, which shows the variations of the $D_{Am}$ and $D_{Eu}$ distribution coefficients as a function of the Diam-8 concentration of the organic phase. Curves III for Am and Eu relate to the tests carried out with an aqueous phase initially containing 1 mol.l$^{-1}$ of HNO$_3$, but whose nitrate concentration was then adjusted to 4 mol.l$^{-1}$ by adding sodium nitrate, whilst the curves IV for Am and Eu relate to tests carried out with an aqueous phase, whose nitric acid concentration was 1 mol.l$^{-1}$.

These curves show that the $D_{Am}$ and $D_{Eu}$ distribution coefficients increase with the Diam-8 cncentration of the organic phase and that the best results are obtained with the aqueous solution, whose nitrate concentration was adjusted to 4 mol.l$^{-1}$.

Example 5

This example relates to the recovery of americium (III) or europium (III) from an aqueous solution with a H$^+$ concentration of 1 mol.l$^{-1}$ and a NO$_3^-$ concentration of 4.1 mol.l$^{-1}$ obtained by adding sodium nitrate to a 1N aqueous nitric acid solution. Use is made of organic phases, each of which contains 0.5 mol.l$^{-1}$ of Diam-8 in different diluents and the extraction is carried out under the same conditions as those of Example 3, after pretreating the organic phase as in this Example, by contacting with an aqueous acid solution.

The americium or europium distribution coefficients are determined as in Example 3, after two minutes of extraction. The results obtained are given in the attached Table 3.

This Table shows that the best results are obtained, when a mixture of dodecane and xylene or a mixture of dodecane and 1-decanol was used as the diluent.

Figure 3:
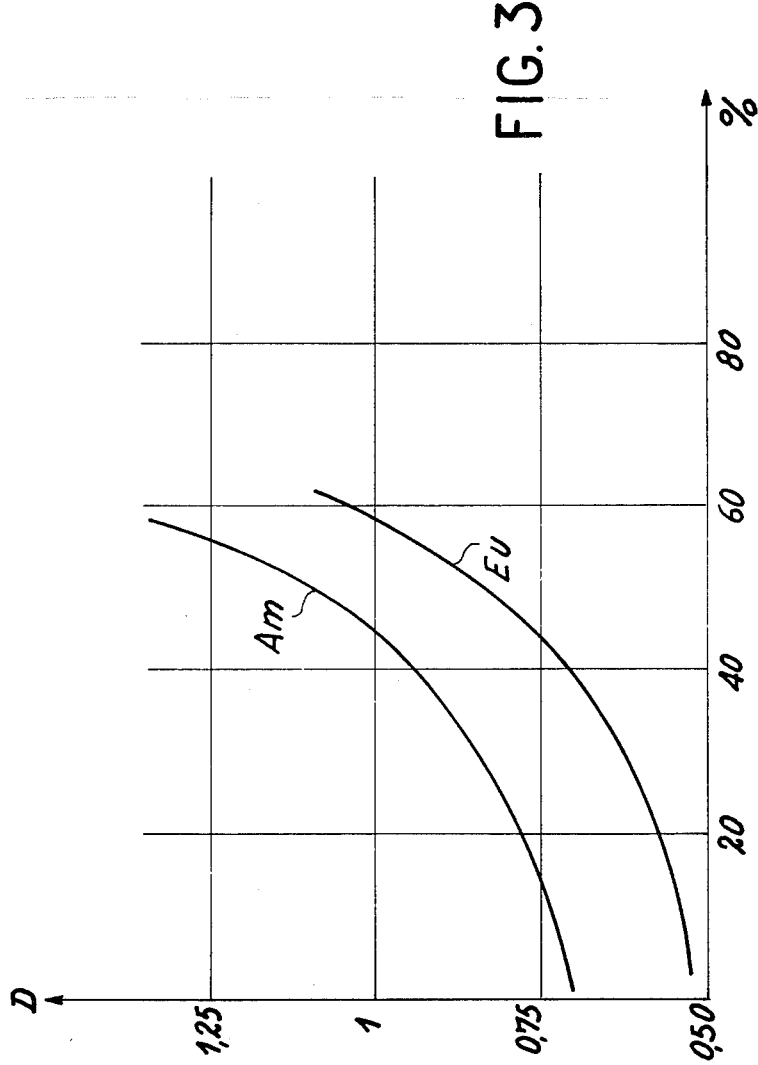
FIG. 3 a graph showing the variations of the distribution coefficients $D_{Am}$ and $D_{Eu}$ of americium and europium, as a function of the dodecane concentration of the diluent used for forming the organic phase.

FIG. 3 shows the results obtained when using as the diluent a mixture of dodecane and Solgyl, whose dodecane content varies between 0 and 60% by volume.

It is clear therefrom that the americium and europium distribution coefficients increase with the dodecane content in the diluent mixture.

Thus, the results obtained can be improved through the presence of dodecane, which has the lowest dielectric constant. However, it is not possible to use dodecane only, because the solubility of Diam-8 in dodecane is limited in the presence of nitrate.

Example 6

In this example, the lanthanides or actinides present in a 3N nitric acid solution containing $5.10^{-2}$ mol.l$^{-1}$ of trivalent lanthanide ions or $10^{-3}$ mol.l$^{-1}$ of trivalent actinide ions are recovered.

Use is made of an organic phase constituted by tert. butyl benzene (Solgyl) containing 1 mol.l$^{-1}$ of N,N'-dimethyl-N,N'-dioctyl malonamide (Diam-8) and the extraction is carried out at ambient temperature and pressure in a bank of mixer-settlers having 10 stages, by using an organic phase/aqueous phase volume ratio of 1. under these conditions, 99.98% of the actinides and 99.6% of the lanthanides are recovered in the organic phase. The acidity of the organic phase is approximately 0.7N on leaving the bank of mixer-settlers.

The actinides and lanthanides are then reextracted in water, by using a bank of mixer-settlers having 9 stages and with an organic phase/aqueous phase volume ratio of 1. Under these conditions 99.9% of the actinides and lanthanides extracted in the organic phase are recovered in the aqueous phase.

Example 7

The actinides and lanthanides present in a 3N nitric acid solution containing $5.10^{-2}$ mol.l$^{-1}$ of trivalent lanthanide ions and $10^{-3}$ mol.l$^{-1}$ of trivalent actinide ions are recovered. The organic phase is constituted by a mixture of 55% by volume of dodecane and 45% by volume of solgyl, containing 1 mol.l$^{-1}$ of N,N'-dimethyl-N,N'-dioctyl malonamide (Diam-8). The extraction is carried out in a bank of mixer-settlers having 10 stages with an organic phase/aqueous phase volume ratio equal to 0.5. Under these conditions, the distribution coefficients $D_{Am}$ and $D_{Eu}$ respectively have the values 3.83 and 2.7 and, at the end of the installation, an organic phase is obtained having an acidity of 0.8N and containing 99.9% of actinides and 98% of lanthanides.

Reextraction is carried out in a bank of mixer-settlers having 10 stages using water and effecting contacting with an aqueous phase/organic phase volume ratio equal to 1. Thus, in the aqueous phase, 99.9% of the actinides and lanthanides present in the organic phase are recovered.

Example 8

In this example, use is made of N,N'-dimethyl-N,N'-dibutyl malonamide of Example 2 diluted in benzene at a concentration 0.5 mol.l$^{-1}$ for the extraction of americium from a nitric solution having a NHO$_3$ concentration of 2 mol.l$^{-1}$ and an americium concentration of $10^{-6}$ mol.l$^{-1}$. Extraction is carried out under the same conditions as in Example 3 and the americium distribution coefficient is determined.

If the americium extraction is carried out under the same conditions, by using an organic phase containing N,N-tetrabutyl malonamide instead of diamide according to the invention, a three times lower partition coefficient is obtained, which demonstrates the superiority of diamide according to the invention, compared with the diamide used in the prior art, although the latter has chains with more carbon atoms, which should help it.

Although the examples only illustrate the recovery of americium and europium, the process according to the invention is applicable to all actinides (III) and lanthanides (III). In addition, similar results have been obtained for the extraction of gadolinium and cerium in the trivalent state.

TABLE 1

| Group | δ(ppm) | Intensity | Multiplicity |
|---|---|---|---|
| CH$_2$CH$_3$ | 0.88 | 6 | multiplet |
| CH$_2$ | 1.30 | 24 | multiplet |
| cis 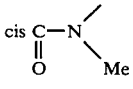 | 2.90 | 3 | singlet |
| trans 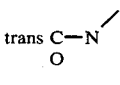 | 3.02 | 3 | doublet |
| $-N\begin{matrix}CH_2-\\ \\ \end{matrix}$ | 3.34 | 4 | multiplet |
| $\underset{\underset{O}{\|\|}}{C}-CH_2-\underset{\underset{O}{\|\|}}{C}$ | 3.45 | 2 | singlet |

TABLE 2

| Group | δ(ppm) | Intensity | Multiplicity |
|---|---|---|---|
| CH$_2$CH$_3$ | 0.92 | 6 | multiplet |
| CH$_2$CH$_3$ | 1.34 | 4 | multiplet |
| CH$_2$CH$_2$CH$_2$ | 1.55 | 4 | multiplet |
| cis 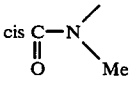 | 2.93 | 3 | doublet |
| trans 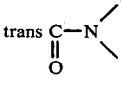 | 3.05 | 3 | doublet |
| N—CH$_2$ | 3.37 | 4 | multiplet |
| $\underset{\underset{O}{\|\|}}{C}-CH_2-\underset{\underset{O}{\|\|}}{C}$ | 3.48 | 2 | singlet |

TABLE 3

| Diluent | $D_{am}$ | $D_{Eu}$ |
| --- | --- | --- |
| Benzene | 0.75 | 0.60 |
| Xylene | 1.05 | 0.80 |
| Mesitylene | 1.10 | 0.80 |
| Solgyl (tert. butyl benzene) | 1.60 | 1.15 |
| Dodecane + decanol 1 (80% and 20% respectively by volume) | 2.70 | 2.05 |
| Dodecane + xylene (80% and 20% respectively by volume) | 7.50 | 5.80 |

What is claimed is:

1. A process of recovering trivalent actinides, trivalent lanthanides, or mixtures thereof from an acid aqueous solution, comprising:
contacting the aqueous solution with an organic solution containing a diamide of the formula:

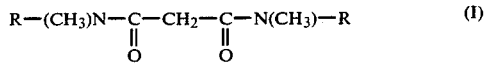

in which R is an alkyl radical with 2 to 10 carbon atoms.

2. A process according to claim 1, wherein R is an alkyl radical with 4 to 8 carbon atoms.

3. A process according to claim 2, wherein R is the butyl radical.

4. A process according to claim 2, wherein R is the octyl radical.

5. The process of claim 1, wherein the diamide concentration of the organic phase is 0.1 to 1.5 mol.l$^{-1}$.

6. The process of claim 1, wherein the organic phase comprises a diluent selected from the group consisting of:
benzene,
xylene,
mesitylene,
ter-butyl benzene,
decanol,
dodecane, and
mixtures thereof.

7. The process of claim 6, wherein the diluent is a mixture of tert-butyl benzene and dodecane, whereof the dodecane concentration varies between 0 and 60% by volume.

8. The process of claim 1, wherein the acid aqueous solution is
a nitric solution, or
a perchloric solution.

9. The process of claim 8, wherein the aqueous solution has a nitric acid concentration of $10^{-1}$ to 5 mol.l$^{-1}$.

10. The process of claim 1, wherein the acid aqueous solution is a nitric solution and nitrate ions are added thereto, before contacting said aqueous solution with the organic phase.

11. The process of claim 1, wherein
the organic phase is pretreated by contacting said phase with an acid aqueous solution with the same acid concentration as the aqueous solution to be treated containing actinides, lanthanides, or a mixture thereof, and wherein
the thus pretreated organic phase is then contacted with the aqueous solution to be treated which contains actinides, lanthanides or a mixture thereof.

* * * * *